United States Patent [19]

Taniguchi et al.

[11] 4,294,939
[45] Oct. 13, 1981

[54] COATING COMPOSITION

[75] Inventors: Eiji Taniguchi; Susumu Akagi, both of Ichihara; Seiichi Torimitsu, Chiba, all of Japan

[73] Assignee: Toray Industries, Inc., Tokyo, Japan

[21] Appl. No.: 186,158

[22] Filed: Sep. 11, 1980

Related U.S. Application Data

[63] Continuation of Ser. No. 930,407, Aug. 2, 1978, abandoned.

[51] Int. Cl.³ ............................................. C08L 63/00
[52] U.S. Cl. ............................. 525/118; 260/336 EP
[58] Field of Search ......................................... 525/118

[56] References Cited

U.S. PATENT DOCUMENTS

| | | | |
|---|---|---|---|
| 3,488,249 | 1/1970 | Wolinski | 260/837 R |
| 3,509,086 | 4/1970 | Rohrbacher | 260/837 R |
| 3,786,113 | 1/1974 | Vassileff | 260/837 R |
| 3,939,114 | 2/1976 | Camelon | 260/837 R |
| 3,943,187 | 3/1976 | Wu | 260/837 |
| 4,006,200 | 2/1977 | Labana | 260/837 |
| 4,065,518 | 12/1977 | Labana | 260/837 |
| 4,129,610 | 12/1978 | Kobayashi | 260/837 R |

FOREIGN PATENT DOCUMENTS 47-51464 12/1972 Japan .............................. 260/837 R

*Primary Examiner*—Paul Lieberman
*Attorney, Agent, or Firm*—Finnegan, Henderson, Farabow, Garrett & Dunner

[57] ABSTRACT

Coating composition comprising (I) cross-linkable basic acrylic component, in which there are present, in polymerized form, (a) 2 to 10(A)% of at least one dialkylaminoalkyl acrylate, (b) 0.5 to 5(B)% of at least one acrylic amide, (c) 0.5 to 20(C)% of at least one hydroxyalkyl acrylate, (d) 35 to 95% of at least one alkyl acrylate, and (e) 0 to 50% of one or more other monomers, wherein the percentages A, B and C satisfy the relation:

$$\frac{14-A}{4} \leq B + C \leq 28 - 2A;$$

and (II) cross-linking polyepoxide component having an epoxy equivalent of 400 or less, the ratio by gram atom of the basic nitrogen in (I) to the epoxy oxygen in (II) being from 0.3 to 3.0.

4 Claims, 1 Drawing Figure

COATING COMPOSITION

This is a continuation of application Ser. No. 930,407, filed Aug. 2, 1978 now abandoned.

FIELD OF THE INVENTION

The present invention relates to a coating composition. More particularly, the present invention relates to a solvent-based coating composition capable of being cured at ambient or slightly elevated temperatures to form a coating on a substrate to which it has been applied, which coating is highly adherent to the substrate and has a balanced combination of desired properties with respect to physical properties such as appearance, hardness, gloss and impact strength, as well as resistance to gasoline and other chemicals.

BACKGROUND OF THE INVENTION

From the viewpoints of preventing environmental pollution and saving materials and energy, there is definitely a need for low polluting inexpensive paints which can be readily applied to substrates. Particularly preferred as coating applications to substrates which cannot be subjected to high temperatures, for example, construction materials such as plastics, wood, concrete and slate, as well as vehicle bodies to be repaired, are non-toxic, low polluting, high solid contents paints which have a good processability during spray painting even with a reduced solvent content and which are capable of providing a coating exhibiting enhanced properties. As such applications, air-drying paints, such as acrylic paints having incorporated therein cellulosic film-forming materials, for example, nitro-cellulose and cellulose acetate butyrate, as well as cross-linkable paints, such as phthalate and urethane paints, have heretofore been used. However, known air-drying paints pose the following problem in the case where a coating of enhanced properties is required. In such case, the acrylic component in the air-drying paints must have an increased degree of polymerization in order to provide a coating of enhanced properties. Using such a component it is difficult to prepare high solid contents paints having a good processability. Known phthalate paints have a good processability; however, some properties of the coating obtained therefrom, such as hardness, are unsatisfactory. Although known urethane paints have a fairly good processability and can provide a coating of desired properties, such paints are expensive and the isocyanates used therein are toxic.

Recent approaches are based on a cross-linkable water-soluble acrylic copolymer in conjunction with a cross-linking polyepoxide compound. According to Japanese Patent Laid-open Specification No. 50(1975)-134,030, published on Oct. 23, 1975, an acrylic copolymer containing tert.-amino groups and carboxyl groups, derived from 12 to 30% by weight of an ethylenically unsaturated compound having a tert.-amino group, such as dimethylaminoethyl methacrylate, 5 to 15% by weight of an ethylenically unsaturated compound having at least one carboxylic group, such as acrylic, methacrylic, maleic or itaconic acid, and the balance of one or more alkyl acrylates or methacrylates or other copolymerizable comonomers, is water-solubilized by neutralization of the carboxyl groups with an amine, and then combined with a polyepoxide compound. According to Japanese Patent Laid-open Specification No. 51(1976)-30,232, published on Mar. 16, 1976, an acrylic copolymer containing tert.-amino groups, derived from 12 to 30% by weight of an ethylenically unsaturated compound having a tert.-amino group, such as dimethylaminoethyl methacrylate, 0 to 15% by weight of an ethylenically unsaturated compound having at least one carboxylic group, such as acrylic, methacrylic, maleic or itaconic acid, and the balance of one or more other copolymerizable comonomers free from an expoxy group, is water-solubilized by neutralization of the tert.-amino groups with an acid, and then combined with a polyepoxide compound. The coating compositions according to these laid-open specifications are low polluting (because such coating compositions are aqueous) and inexpensive, and can form a coating exhibiting relatively satisfactory properties. However, attainable properties of the coating, such as gasoline and water resistances, gloss and weatherability, are not necessarily well balanced. For example, a coating having a satisfactory gasoline resistance is frequently poor in gloss. Furthermore, it has been found that it is not easy to prepare high solid contents paints of a good processability using the water-soluble acrylic components.

Besides the above-discussed laid-open specifications, Japanese Patent Laid-open Specification No. 52(1977)-32,927, published on Mar. 12, 1977, discloses and claims a composition for coating ship bottoms comprising (A) 70 to 98% by weight of an acrylic copolymer and (B) 30 to 2% by weight of an epoxy compound, which acrylic copolymer is derived from 50 to 98% by weight based on the copolymer of $C_6$–$C_{20}$-alkyl or cycloalkyl acrylate or methacrylate, 2 to 20% by weight based on the copolymer of an ethylenically unsaturated compound having a basic nitrogen atom, such as dimethylaminoethyl methacrylate, and, as the balance, one or more other copolymerizable comonomers. The specification teaches that in view of the intended use of the coating in a submerged condition in the sea, the $C_6$ or higher alkyl or cycloalkyl acrylate or methacrylate component should constitute a major proportion of the acrylic copolymer so as to render the coating sufficiently water repellent.

SUMMARY OF THE INVENTION

The invention relates to an improvement of the known coating compositions of the type as disclosed in the above-mentioned Japanese laid-open specifications. In order to achieve a balanced combination of the desired properties in the coating, especially those properties required for repairing vehicle bodies, it has now been found that particularly selected monomers should be used in particularly selected proportions for the manufacture of the acrylic component. Thus, provided in accordance with the invention is a coating composition comprising:

(I) a polymeric cross-linkable basic nitrogen atom-containing acrylic component comprising at least one film-forming acrylic copolymer containing basic nitrogen atoms, in which component there are present, based on the weight of the component, (a) 2 to 10% (A%) by weight of polymerized units derived from at least one basic nitrogen atom-containing acrylate selected from the group consisting of di($C_{1-2}$alkyl)amino $C_{1-3}$alkyl acrylates and methacrylates, (b) 0.5 to 5% (B%) by weight of polymerized units derived from at least one acrylic amide selected from the group consisting of acrylamide and methacrylamide, (c) 0.5 to 20% (C%) by weight of polymerized units derived from at least one hydroxyl-containing acrylic monomer selected from the group consisting of hydroxy $C_{2-4}$alkyl acrylates and methacrylates, (d) 35 to 95% by weight of polymerized units derived from at least one alkyl acrylate selected from the group consisting of $C_{1-4}$alkyl acrylates and methacrylates, and (e) 0 to 50% by weight of polymerized units derived from one or more other copolymerizable ethylenically unsaturated monomers, wherein the percentages A, B and C satisfy the relation:

$$\frac{14 - A}{4} \leq B + C \leq 28 - 2A, \text{ and};$$

(II) a cross-linking component comprising at least one polyepoxide compound having an epoxy equivalent of not more than 400 and containing at least two epoxy groups per molecule, said cross-linkable component (I) and cross-linking component (II) being present in said composition so that the ratio by gram atom of the basic nitrogen atom in the component (I) to the epoxy oxygen atom in the component (II) falls within the range of between 0.3 and 3.0.

DETAILED DESCRIPTION OF THE INVENTION

The units (a) in the acrylic component (I) provide main functional groups which react with epoxy groups in the polyepoxide component (II) to form a cross-linkage. The units (a) are derived from one or more di(C-1-2alkyl)amino $C_{1-3}$alkyl acrylates and methacrylates, such as dimethylaminoethyl acrylate or methacrylate and diethylaminoethyl acrylate or methacrylate. The units (a) should be present in the acrylic component (I) in a proportion of at least 2% by weight based on the component (I), or otherwise some properties, especially solvent resistance and hardness of the coating, will tend to become unsatisfactory. As far as the solvent resistance and hardness are concerned, both of these properties are improved as the proportion of the units (a) increases up to 10% by weight or more. However, if the proportion is substantially in excess of 10% by weight, further improvements of these properties are not expected, and some properties, such as water resistance and appearance, are adversely affected.

The units (b) derived from acrylamide and/or methacrylamide provide functional groups which may add some auxiliary effect to that of the functional groups provided by the units (a). It has been found that the presence of 0.5 to 5% by weight of the units (b) in the acrylic component (I) enhances the hardness and gasoline and solvent resistance of the coating, although the solubility of the component (I) is slightly lowered. Use of the units (b) substantially in excess of 5% by weight must be avoided, or otherwise the acrylic component will become less soluble and thus cause the processability of the coating composition to be unsatisfactory. In addition, the water resistance and the adhesion of the coating will become adversely affected.

The units (c) also provide functional groups which may add some auxiliary effect to that of the functional groups provided by the units (a). The units (c) are derived from one or more hydroxy $C_{2-4}$alkyl acrylates and methacrylates, such as 2-hydroxyethyl acrylate or methacrylate and 2-hydroxypropyl acrylate or methacrylate. It has been found that the presence of 0.5 to 20% by weight of the units (c) in the acrylic component (I) not only enhances the solubility of the component (I), but also improves the hardness, gasoline and solvent resistances, and weatherability of the coating. However, use of unduly excessive amounts of the units (c) must be avoided, or otherwise the water resistance of the coating and the processability of the coating composition will be adversely affected.

The units (d) are not reactive with the polyepoxide component (II), but form backbones of the acrylic component (I). The units (d) are derived from one or more $C_{1-4}$alkyl acrylates and methacrylates, including, for example, methyl, ethyl, n-propyl, isopropyl, n-butyl and isobutyl acrylates and methacrylates. The units (d) should occupy 35 to 95%, preferably 50 to 80%, by weight of the acrylic component (I).

The acrylic component (I) may contain up to 50% by weight of units (e) derived from one or more other copolymerizable ethylenically unsaturated monomers, including, for example, styrene, acrylic and methacrylic acids, α-methylstyrene, vinyl acetate, acrylonitrile, methacrylonitrile and $C_5$ or higher alkyl acrylates and methacrylates. Among others styrene is preferred. Preferred amounts of such monomers, if used, depend on the nature of the particular monomers. For styrene and α-methylstyrene up to 50%, preferably 10 to 40% by weight, for acrylic and methacrylic acids up to 10% by weight, and for other monomers up to 20% by weight, may be respectively used.

The essential feature of the invention resides in the fact that there are present in the acrylic component (I), in addition to the units (a) and (d), small but definite amounts oof the units (b) and (c), and that A, B and C, which are percentages of the units (a), (b) and (C), respectively, satisfy the relation:

$$\frac{14 - A}{4} \leq B + C \leq 28 - 2A.$$

This relation will be discussed in detail hereinafter.

Conveniently, the acrylic component (I) may comprise an acrylic copolymer comprising the polymerized units (a), (b), (c), (d) and optionally (e). Such a copolymer may advantageously be prepared by radical polymerization in solution in a manner known per se. In short, selected proportions of selected monomers may be polymerized in solution, using as a solvent aromatic hydrocarbons such as toluene or xylene, alcohols such as isobutanol or isopropanol, esters such as ethyl acetate or butyl acetate, alone or in combination, in the presence of an initiator, such as azobis compounds, for example, azobisisobutyronitrile and azobiscyclohexanitrile, and peroxides, for example, benzoyl peroxide and tert.-butyl peroxide, and optionally in the presence of a chain transfer agent, for example, mercaptans, such as dodecyl mercaptan and thioglycolic acid.

The acrylic component may be a blend of two or more acrylic copolymers containing basic nitrogen atoms. For example, it may comprise a first acrylic copolymer composed of a part of the units (a), all of the units (b), a part of the units (d) and a part of the units (e), and a second acrylic copolymer composed of the remaining part of the units (a), all of the units (c), the remaining part of the units (d) and the remaining part of the units (e). Other modifications will be apparent to those skilled in the art.

As the cross-linking component (II), use is made of one or more polyepoxide compounds having an epoxy equivalent of not more than 400, preferably but more than 250, and containing two or more epoxy groups per molecule. Among others, preferred polyepoxide compounds are glycidyl ethers of polyhydric alcohols, such as ethylene glycol diglycidyl ether, glycerol polyglycidyl ethers, polyglycerol polyglycidyl ethers and sorbitol polyglycidyl ethers. Polymers of glycidyl acrylate and/or methacrylate, as well as polyepoxide compounds derived from bisphenol compounds and epihalohydrin, may also be used provided that the polyepoxide compounds satisfy the above-mentioned requirements.

The components (I) and (II) should be present in the coating composition according to the invention so that the ratio by gram atom of the basic nitrogen atom in the component (I) to the epoxy oxygen atom in the component (II) falls within the range of between 0.3 to 3.0, and preferably within the range of between 0.5 and 1.5.

Preparation of the coating composition of the invention by mixing the acrylic component (I) with the polyepoxide component (II) should desirably be carried out immediately before the composition is to be applied to a substrate. Thus, a composition which contains the acrylic component (I) and to which pigments, additives and solvents may have been added, if desired, may be combined with a composition which contains the polyepoxide component (II) and to which solvents and other additives may have been optionally added. The resultant mixture may be stirred, and then applied to the substrate optionally after adding thereto additional amounts of solvents and other additives but before being allowed to stand for a prolonged period of time. The coating so formed may be dried by allowing it to stand at ambient temperature or by heating it to a slightly elevated temperature of up to 80° C. or higher thereby to effect cross-linking to form a cured coating.

The coating composition in accordance with the invention has an enhanced processability for spray coating, and thus, it is possible according to the invention to produce a paint of high solid contents. In other words, the coating composition in accordance with the invention may, when it has been diluted to a degree of optimum viscosity for spray painting, still have a solid content of as high as up to 40% by weight or more. The composition in accordance with the invention can provide a coating which is highly adherent to a substrate and which has well-balanced desired properties, including appearance, gloss, hardness, impact strength, gasoline, water, alkali and solvent resistances and weatherability.

The coating composition in accordance with the invention may be advantageously utilized for applications in which a balanced combination of enhanced properties of the coating is desired, in particular, for repairing vehicle bodies. It may also be utilized for forming a coating on materials, such as metals, construction materials, for example, plastics, wood or concrete, and other materials which particularly cannot be treated or should not be treated at high temperatures. Furthermore, in view of its excellent adhesion to the substrate, the coating composition according to the invention can be utilized in cases wherein adhesion to substrates is particularly required, for example, for coating chromium plated steel, stainless steel, various films or sheets and shaped articles of propylene polymers, and also as adhesives and various primings.

The invention and the particular technical effect thereof will be further described in the following working and comparative examples, in which all "parts" are by weight unless otherwise specified.

EXAMPLE 1

A flask equipped with a condenser, thermometer and stirrer was charged with 80 parts of toluene, 20 parts of isobutanol, 6 parts of dimethylaminoethyl methacrylate, 3 parts of acrylamide, 8 parts of 2-hydroxyethyl methacrylate, 10 parts of ethyl acrylate, 10 parts of butyl acrylate, 40 parts of methyl methacrylate, 23 parts of styrene and 1 part of azobisisobutyronitrile. The mixture was stirred at a temperature of 80° C. for a period of 2 hours. At the end of the period, 0.3 part of azobisisobutyronitrile was added to the mixture. The stirring was continued at the same temperature for 2 hours. The addition of 0.3 part of azobisisobutyronitrile was effected 5 times in total during the two-hour intervals. After addition of the last portion of the catalyst was completed, the mixture was further stirred at the same temperature. After 16 hours in total the polymerization was completed to provide a solution of a polymeric cross-linkable basic acrylic component (I). The solution of the component (I) so prepared was clear and transparent.

A mixture of 12 parts of the solution of the acrylic component (I), 20 parts of toluene and 40 parts of a pigment (titanium oxide supplied by Ishihara Industries Co., Ltd) was shaken together with sand grinder beads to disperse the pigment. From the resultant mixture the beads were removed. The pigment dispersion so prepared was combined with 110 parts of the solution of the acrylic component (I) and 5 parts of sorbitol polyglycidyl ether (supplied by Nagase Industries Co., Ltd.), and the resultant mixture was then diluted with a commercial thinner for lacquer to provide a coating composition exhibiting a flowthrough time of about 17 seconds by a Ford cup No. 4 test. The processability for spray painting was evaluated on such a diluted composition exhibiting a flowthrough time of about 17 seconds by the Ford cup No. 4 test. Such a composition is believed to have an optimum solid content for spray painting. The results in Table 1 are stated in terms of % by weight of the solid content of such a composition.

Tin plates were spray-coated with the coating composition, and dried for 30 minutes at 70° C. and then for 7 days at ambient temperature to provide specimen samples having a dried coating of about 35 μm in thickness.

Thereafter, the samples were tested for various properties.

Appearance was evaluated based on visual observations. The results in Table 1 are given on a scale of 1 to 5, in which 1, 2, 3, 4 and 5 represent excellent, good, fair, slightly poor and poor, respectively.

Gloss was measured in accordance with the Japanese Industrial Standards (JIS) K 5400 using a polished, planar, black glass having a specular gloss value of 92 for 60° geometry as the standard. The results in Table 1 are quoted in terms of 60° specular gloss.

Adhesion was evaluated by applying a cross-hatch pattern (each square having sides which are each 1 mm in length) onto the coating with a glassware which penetrated into the tin substrate, applying a pressure sensitive adhesive tape to the hatched coating and evaluating the area of coating removed from the sample surface when the tape was separated sharply from the sample. The results in Table 1 are stated in terms of the area of coating remaining after removal of the adhesive tape.

Gasoline resistance was determined by soaking the coating in regular gasoline for a period of 2 hours, and evaluating the treated coating based on visual observations. The results in Table 1 are given on a scale of 1 to 5, in which 1, 2, 3, 4 and 5 represent no change, little change, slightly softened, softened and whitened, respectively.

Water or alkali resistance was determined by soaking the coating in water maintained at a temperature of 50° C. for a period of 3 days or in a 5% aqueous NaOH at 23° C. for 2 days and evaluating the treated coating based on visual observations. The results in Table 1 are given on a scale of 1 to 5, in which 1, 2, 3, 4 and 5 represent no change, little change, slight loss of gloss, loss of gloss, and blistered and/or peeled condition, respectively.

Solvent resistance was determined by wiping the surface of the coating 60 times with a cloth impregnated with methanol and evaluating the treated area based on visual observations. The results in Table 1 are given on a scale of 1 to 5, in which 1, 2, 3, 4 and 5 indicate no change, little change, slightly dissolved condition, dissolved condition and extensively dissolved condition, respectively.

Weatherability was determined by subjecting the coating to accelerated exposure conditions in a Weather-O-meter for a period of 400 hours and evaluating the treated coating based on visual observations. The results in Table 1 are given on a scale of 1 to 5, in which 1, 2, 3, 4 and 5 represent no change, little change, slight loss of gloss, loss of gloss, and cracked and/or peeled condition, respectively.

As shown in Table 1, an excellent coating having a balanced combination of desired properties was obtained from the coating composition of this Example.

EXAMPLE 2

Following the general procedures as described in Example 1, a solution of an acrylic component (I) was prepared starting from 80 parts of toluene, 20 parts of isopropanol, 4 parts of dimethylaminoethyl methacrylate, 3 parts of acrylamide, 13 parts of 2-hydroxyethyl methacrylate, 14 parts of butyl acrylate, 45 parts of methyl methacrylate, 20 parts of styrene, 1 part of methacrylic acid and 1 part of an initial charge of azobisisobutyronitrile. Similarly, a coating composition and specimen samples were prepared, and various tests thereon were carried out. Table 1 reveals that the coating so obtained had a balanced combination of desired properties.

EXAMPLE 3

Following the general procedures as described in Example 1, a solution of an acrylic component (I) was prepared starting from 90 parts of toluene, 10 parts of isobutanol, 3 parts of dimethylaminoethyl methacrylate, 2 parts of acrylamide, 4 parts of 2-hydroxylethyl methacrylate, 25 parts of n-butyl methacrylate, 65 parts of methyl methacrylate, 1 part of methacrylic acid and 0.8 part of an initial charge of azobisisobutyronitrile. A coating composition and test specimens were prepared in a manner as described in Example 1 but using glycerol polyglycidyl ether in place of the sorbitol polyglycidyl ether of Example 1. The test specimens were tested for various properties. The coating had a balanced combination of desired properties, as shown in Table 1.

EXAMPLE 4

The same procedures for Example 1 were repeated except that an initial charge consisting of 100 parts of toluene, 8 parts of dimethylaminoethyl methacrylate, 1 part of methacrylamide, 2 parts of hydroxypropyl methacrylate, 15 parts of butyl acrylate, 14 parts of methyl methacrylate, 30 parts of isobutyl methacrylate, 30 parts of styrene and 1 part of azobisisobutyronitrile was used. Table 1 shows that a coating with a balanced combination of desired properties was obtained.

EXAMPLE 5

Following the general procedures as described in Example 1, a solution of an acrylic component (I) was prepared starting from a mixture consisting of 90 parts of toluene, 10 parts of isobutanol, 6 parts of diethylaminoethyl methacrylate, 2 parts of acrylamide, 4 parts of 2-hydroxyethyl methacrylate, 23 parts of ethyl acrylate, 65 parts of methyl methacrylate and 0.8 part of an initial charge of azobisisobutyronitrile. Two hundred parts of the solution were combined with 8 parts of glycerol polyglycidyl ether, and the resultant mixture was then diluted with a thinner for lacquer to provide a coating composition having an optimum solid content for spray painting (about 17 seconds using a Ford cup No. 4). Slate plates were spray-coated with the coating composition to provide a coating of about 40 $\mu$m (in dryness) and then dried at ambient temperature for 10 days. The coating was tested for various properties. The results are shown in Table 1. As shown in Table 1, the coating had a balanced combination of desired properties.

EXAMPLE 6

Starting from an initial charge consisting of 80 parts of toluene, 20 parts of xylene, 7 parts of dimethylaminoethyl methacrylate, 1 part of acrylamide, 6 parts of 2-hydroxyethyl methacrylate, 40 parts of ethyl acrylate, 17 parts of methyl methacrylate, 28 parts of styrene, 1 part of methacrylate acid and 1 part of azobisisobutyronitrile, the general procedures as described in Example 1 were repeated to prepare a solution of an acrylic component (I). Two hundred parts of the solution were combined with 10 parts of sorbitol polyglycidyl ether, and the resultant mixture was then diluted with a thinner for lacquer to provide a coating composition having an optimum solid content for spray painting (about 17 seconds using a Ford cup No. 4). Chromium-plated steel sheets were spray-coated with the coating composition to provide a coating of about 30 $\mu$m (in dryness) and then dried for 30 minutes at 70° C. and thereafter for 7 days at ambient temperature. The coating was tested for various properties. The coating was found to be adherent and had a balanced conbination of desired properties, as shown in Table 1.

EXAMPLE 7

A mixture of 200 parts of the acrylic solution prepared in Example 3 and 6 parts of sorbitol polyglycidyl ether was diluted with a thinner for lacquer to provide a coating composition having an optimum solid content for spray painting as determined by means of the Ford cup No. 4 test. Pieces of ABS resin board were spray-coated with the coating composition to provide a coating of about 30 $\mu$m in thickness (in dryness), and dried for 30 minutes at 70° C. and thereafter for 7 days at ambient temperature. Various properties of the coating were tested. The coating had a balanced combination of desired properties, as shown in Table 1.

COMPARATIVE EXAMPLE 1

Example 1 was repeated except that the acrylamide used therein was omitted and 11 parts of the 2-hydroxyethyl methacrylate were used instead of the amount of 8 parts stated in Example 1. The coating did not have a balanced combination of desired properties, and was poor in gasoline resistance. The results of this Comparative Example 1 are shown in Table 1.

COMPARATIVE EXAMPLE 2

Example 1 was repeated except that the 2-hydroxyethyl methacrylate used therein was omitted and 11 parts of the acrylamide were used instead of the amount of 3 parts stated in Example 1. The acrylic component solution as prepared was extremely turbid. The coating obtained did not have a balanced combination of desired properties, because it was unsatisfactory with respect to the appearance, gloss, adhesion, impact strength and weatherability of the coating as well as to the processability of the coating composition, as shown in Table 1.

COMPARATIVE EXAMPLE 3

Example 2 was repeated except that the 2-hydroxyethyl methacrylate, butyl acrylate and methyl methacrylate were used in amounts of 24, 10 and 38 parts, respectively. The test results shown in Table 1 reveal that the coating obtained did not have a balanced combination of desired properties, because the appearance and water resistance of the coating as well as the processability of the coating composition were unsatisfactory.

COMPARATIVE EXAMPLE 4

Example 2 was repeated except that the dimethylaminoethyl methacrylate and methyl methacrylate were used in amounts of 1 and 48 parts, respectively. The test results given in Table 1 show that the coating obtained did not have a balanced combination of desired properties, because it was unsatisfactory with respect to the adhesion and hardness and to the gasoline, alkali and solvent resistances as well as to the weatherability.

COMPARATIVE EXAMPLE 5

Example 2 was repeated except that the dimethylaminoethyl methacrylate and methyl methacrylate were used in amounts of 1 and 67 parts, respectively. The results shown in Table 1 reveal the fact that the coating obtained did not have a balanced combination of desired properties, i.e., the obtained coating was unsatisfactory with respect to the hardness and gasoline, alkali and solvent resistances as well as to weatherability.

COMPARATIVE EXAMPLE 6

Example 3 was repeated except that the acrylamide, 2-hydroxyethyl methacrylate, n-butyl methacrylate and methyl methacrylate were used in amounts of 0.5, 0.5, 26 and 69 parts, respectively. The test results given in Table 1 reveal that the coating obtained did not have a balanced combination of desired properties, i.e., the hardness and gasoline, alkali and solvent resistances as well as the weatherability of the coating were unsatisfactory.

COMPARATIVE EXAMPLE 7

Example 4 was repeated except that the methacrylamide and hydroxypropyl methacrylate used therein were omitted and that 33 parts of the isobutyl methacrylate were used instead of the amount of 30 parts in Example 4. The test results given in Table 1 reveal that the coating obtained was unsatisfactory with respect to the hardness, solvent resistance and weatherability.

COMPARATIVE EXAMPLE 8

Example 4 was repeated except that the methacrylamide, hydroxypropyl methacrylate and isobutyl methacrylate were used in amounts of 3, 13 and 17 parts, respectively. The test results shown in Table 1 reveal that the coating obtained did not have a balanced combination of desired properties, because it was unsatisfactory with respect to the appearance and water resistance of the coating.

COMPARATIVE EXAMPLE 9

Example 3 was repeated except that the dimethylaminoethyl methacrylate, n-butyl methacrylate and methyl methacrylate were used in amounts of 12, 19 and 62 parts, respectively. The acrylic component solution as prepared exhibited a bad orange discoloration. The test results given in Table 1 show that the coating obtained was unsatisfactory with respect to the alkali resistance and weatherability.

COMPARATIVE EXAMPLE 10

A commercial acrylic white lacquer for coating vehicle bodies was tested in the manner as described in Example 1. The results shown in Table 1 reveal that the adhesion, various chemical resistances and weatherability of the coating were poor.

EXPLANATION OF THE DRAWINGS

The invention will be further described with reference to the attached drawings, in which In FIG. 1, the following relations:

Figure 1:
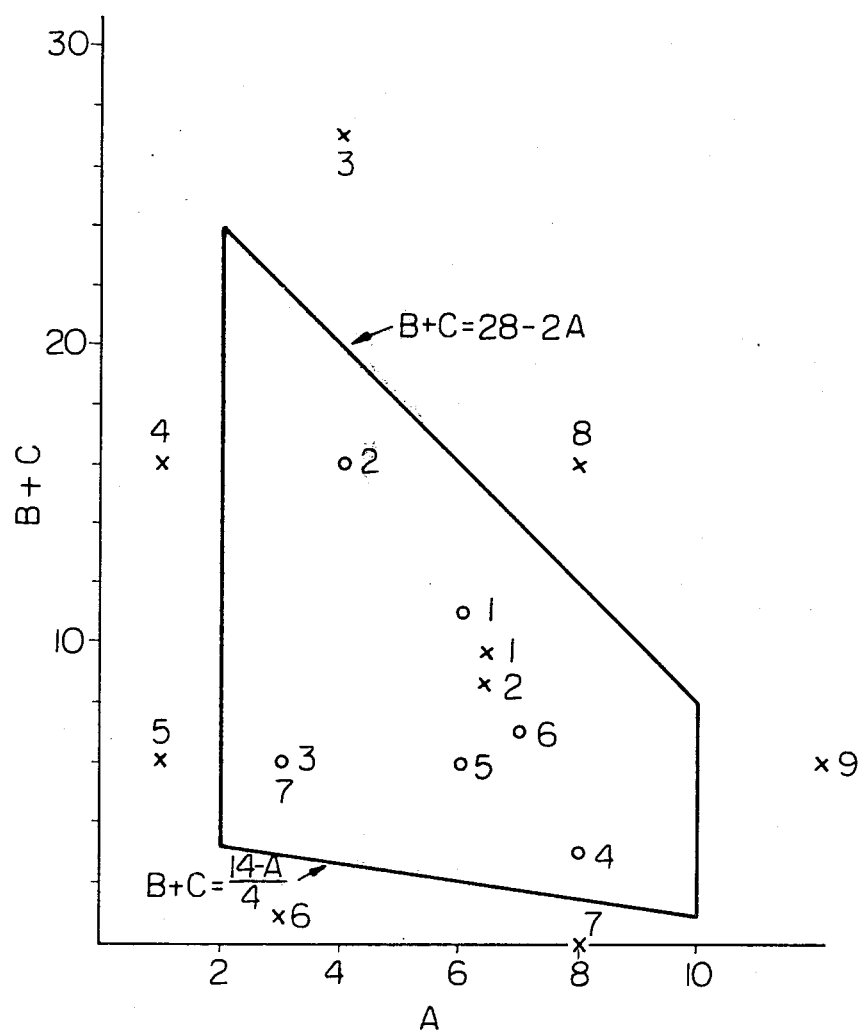
FIG. 1 is a graph showing the co-relationship between A, i.e., the percentage of the units (a) in the acrylic component (I) and B+C, i.e., the sum of the percentages of the units (b) and (c) in the acrylic component (I). The plotted circles (O) 1 through 7 represent the acrylic components used in Examples 1 through 7, respectively, while the plotted crosses (X) 1 through 9 represent the acrylic components used in Comparative Examples 1 through 9, respectively.

$$2 \leq A \leq 10$$
and
$$\frac{14 - A}{4} \leq B + C \leq 28 - 2A$$

are satisfied by the values lying on or within the perimeter of the plotted quadrangle. If (14-A/4) is greater than B+C, the hardness, solvent resistance and weatherability become unsatisfactory, as seen from FIG. 1 and the results of Comparative Examples 6 and 7 shown in Table 1, whereas if B+C is greater than 28-2A, the water resistance and gloss become poor, as seen from FIG. 1 and the results of Comparative Examples 3 and 8 shown in Table 1.

TABLE 1

| | Examples According to the Invention | | | | | | |
|---|---|---|---|---|---|---|---|
| | 1 | 2 | 3 | 4 | 5 | 6 | 7 |
| Appearance of solution of component (I) | transparent | transparent | transparent | transparent | transparent | transparent | transparent |
| Processability for spray painting | 41 | 39 | 37 | 40 | 30 | 33 | 37 |
| Appearance of coating | 1 | 1 | 2 | 1 | 2 | 1 | 1 |
| Gloss | 90 | 91 | 89 | 90 | — | — | 90 |
| Pencil hardness | 2H | 2H | 2H | H | H | H | F-H |
| Adhesion | 100/100 | 100/100 | 100/100 | 100/100 | 100/100 | 100/100 | 100/100 |
| Gasoline resistance | 1 | 2 | 1 | 2 | 1 | 2 | 1 |
| Water resistance | 2 | 1 | 1 | 1 | 2 | 2 | 1 |
| Alkali resistance | 1 | 2 | 2 | 1 | 1 | 1 | 1 |
| Solvent resistance | 1 | 3 | 1 | 2 | 2 | 1 | 1 |
| Du Pont impact (load of 500 g) | 50 cm | 50 cm | 50 cm | 50 cm | — | 50 cm | 50 cm |
| Weatherability | 2 | 1 | 3 | 2 | 1 | 2 | 2 |

| | Comparative Examples | | | | | | | | | |
|---|---|---|---|---|---|---|---|---|---|---|
| | 1 | 2 | 3 | 4 | 5 | 6 | 7 | 8 | 9 | 10 |
| Appearance of solution of Component (I) | transparent | turbid | transparent | transparent | transparent | transparent | transparent | transparent | badly discolored | — |
| Processability for spray painting | 40 | 27 | 28 | 40 | 37 | 39 | 38 | 30 | 35 | 27 |
| Appearance of coating | 1 | 5 | 4 | 1 | 2 | 2 | 1 | 4 | 3 | 3 |
| Gloss | 90 | 72 | 78 | 90 | 85 | 86 | 88 | 75 | 78 | 77 |
| Pencil hardness | H | 2H | 2H | F | F | F | HB-F | H | 2H | H |
| Adhesion | 100/100 | 0/100 | 100/100 | 50/100 | 100/100 | 100/100 | 100/100 | 100/100 | 100/100 | 0/100 |
| Gasoline resistance | 4 | 1 | 1 | 5 | 4 | 4 | 3 | 1 | 1 | 4 |
| Water resistance | 1 | 3 | 4 | 3 | 3 | 1 | 2 | 4 | 5 | 4 |
| Alkali resistance | 2 | 2 | 1 | 4 | 5 | 4 | 3 | 2 | 1 | 4 |
| Solvent resistance | 3 | 2 | 2 | 4 | 5 | 4 | 4 | 1 | 2 | 5 |
| Du Pont impact (load of 500 g) | 50 cm | 10 cm | 50 cm | 50 cm | 30 cm | 30 cm | 30 cm | 50 cm | 30 cm | 10 cm |
| Weatherability | 2 | 4 | 3 | 4 | 4 | 4 | 4 | 3 | 4 | 5 |

What we claim is:

1. An organic solvent-based coating composition comprising:
   (I) a water-insoluble polymeric cross-linkable basic nitrogen atom-containing acrylic component comprising at least one film-forming acrylic copolymer containing basic nitrogen atoms, in which component there are present, based on the weight of said component:
   (a) 2 to 10% by weight of polymerized units derived from at least one basic nitrogen atom-containing acrylate selected from the group consisting of di($C_{1-2}$alkyl)amino $C_{1-3}$alkyl acrylates and methacrylates,
   (b) 0.5 to 5% (B%) by weight of polymerized units derived from at least one acrylic amide selected from the group consisting of acrylamide and methacrylamide,
   (c) 0.5 to 20% (C%) by weight of polymerized units derived from at least one hydroxyl-containing acrylic monomer selected from the group consisting of hydroxy $C_{2-4}$alkyl acrylates and methacrylates,
   (d) 35 to 95% by weight of polymerized units derived from at least one alkyl acrylate selected from the group consisting of $C_{1-4}$alkyl acrylates and methacrylates, and
   (e) 0 to 50% by weight of polymerized units derived from one or more other copolymerizable ethylenically unsaturated monomers, said percentages A, B and C satisfying the relation:

$$\frac{14 - A}{4} \leq B + C \leq 28 - 2A, \text{ and;}$$

(II) a cross-linking component comprising at least one polyepoxide compound having an epoxy equivalent of not more than 400 and containing at least two epoxy groups per molecule, said cross-linkable component (I) and cross-linking component (II) being present in said composition so that the ratio by gram atom of the basic nitrogen atom in said component (I) to the epoxy oxygen atom in said component (II) falls within the range of between 0.3 and 3.0.

2. A coating composition in accordance with claim 1 wherein said polyepoxide compound has an epoxy equivalent of not more than 250.

3. A coating composition in accordance with claim 2 wherein said polyepoxide compound is a glycidyl ether of a polyhydric alcohol selected from the group consisting of ethylene glycol diglycidyl ether, glycerol polyglycidyl ethers, polyglycerol polyglycidyl ethers and sorbitol polyglycidyl ethers.

4. A coating composition in accordance with any one of the preceding claims wherein said cross-linkable component (I) and cross-linking component (II) are present in said composition such that the ratio by gram atom of the basic nitrogen atom in said component (I) to the epoxy oxygen atom in said component (II) falls within the range of between 0.5 and 1.5.

* * * * *

UNITED STATES PATENT AND TRADEMARK OFFICE
CERTIFICATE OF CORRECTION

PATENT NO. : 4,294,939
DATED : October 13, 1981
INVENTOR(S) : Eiji Taniguchi et al.

It is certified that error appears in the above—identified patent and that said Letters Patent is hereby corrected as shown below:

Claim 1, line 47, change "10% by" to --10% (A%) by--.

Signed and Sealed this

Twenty-second Day of December 1981

|SEAL|

Attest:

GERALD J. MOSSINGHOFF

Attesting Officer     Commissioner of Patents and Trademarks